United States Patent [19]

Wilcox, deceased

[11] Patent Number: 4,737,013
[45] Date of Patent: Apr. 12, 1988

[54] MICROCHANNEL PLATE HAVING AN ETCH LIMITING BARRIER

[75] Inventor: Richard E. Wilcox, deceased, late of Berkeley, Calif., by Claire Wilcox, executrix

[73] Assignee: Litton Systems, Inc., Woodland Hills, Calif.

[21] Appl. No.: 925,990

[22] Filed: Nov. 3, 1986

[51] Int. Cl.⁴ .............................................. G02B 6/08
[52] U.S. Cl. ................. 350/96.27; 350/96.33
[58] Field of Search ............ 65/3.11, 3.12, 4.1, 65/4.2; 350/96.24, 96.25, 96.27, 96.32, 96.33

[56] References Cited

U.S. PATENT DOCUMENTS 3,366,506  1/1968  Granitsas et al. ............ 350/96.27 X
3,742,224  6/1973  Einstein ...................... 250/227 X
3,948,582  4/1976  Martin ........................ 250/227 X

FOREIGN PATENT DOCUMENTS 0007808  1/1986  Japan .......................... 350/96.27

Primary Examiner—Eugene R. LaRoche
Assistant Examiner—Steven J. Mottola
Attorney, Agent, or Firm—Poms, Smith, Lande & Rose

[57] ABSTRACT

An improved microchannel plate is shown fabricated from tubes formed from at least two types of cladding glass and a core glass, including a first cladding of partial acid resistant glass and a second, super cladding of high acid resistant glass. The first cladding may surround a hollow core that forms a passage or it may surround a core of low acid resistant glass which is removed by an acid bath to form the passage. The second cladding surrounds the first, while the opening of the passage surrounded by the first cladding is tapered by an acid etch that does not affect the second cladding. Thus, the ratio of the open area of the passages to their end surface area is controlled only by the removal of the first cladding.

19 Claims, 2 Drawing Sheets

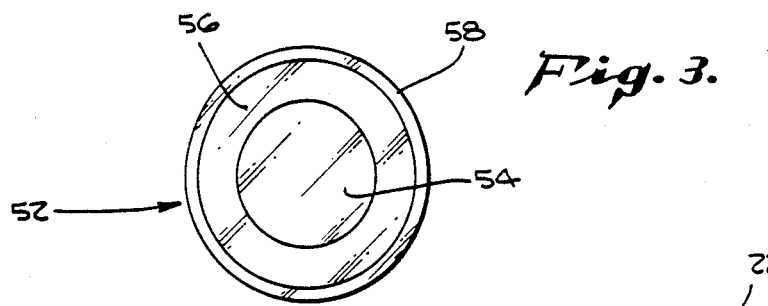
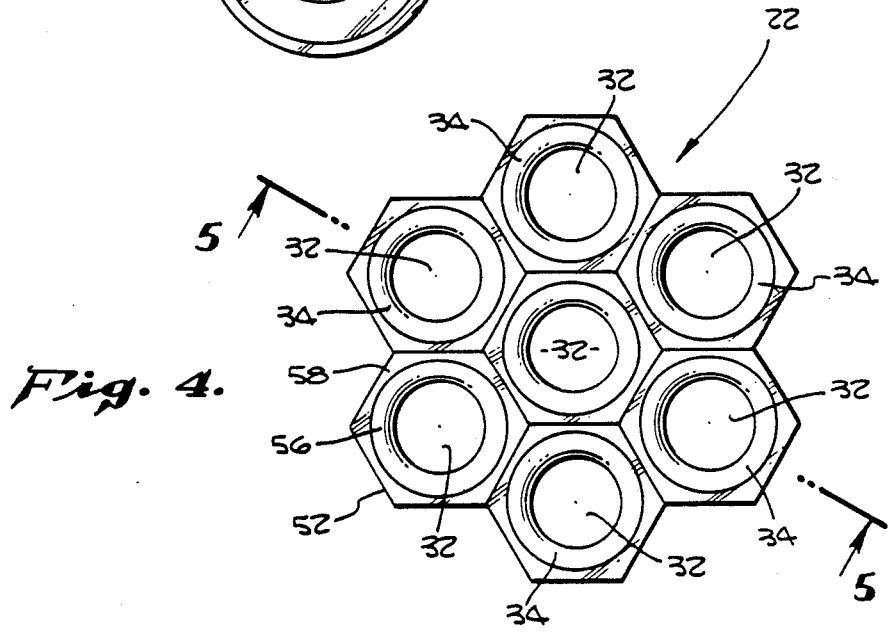
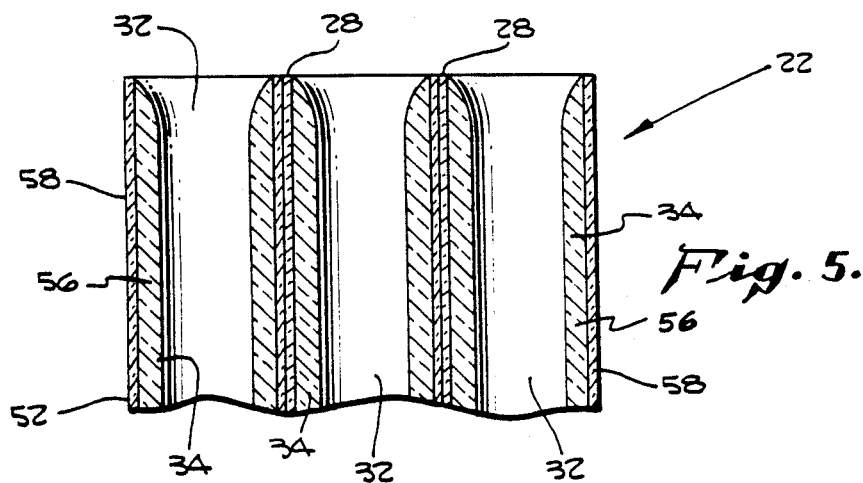

MICROCHANNEL PLATE HAVING AN ETCH LIMITING BARRIER

The present invention relates to a microchannel plate having an improved noise figure and, more particularly, to a microchannel plate which may be used within a light amplifier.

BACKGROUND OF THE INVENTION

Microchannel plates may be used in various devices including light amplification devices to intensify an image where limited light is available, such as at night where an ordinary person would find the darkness impossible to penetrate with unaided eyes. Such aid is provided by light amplification devices which find application in security work, where police officers or security guards may use them for protection or to detect intruders, and in military applications, where soldiers use them for battlefield surveillance.

The microchannel plate comprises a bundle of very small cylindrical tubes which have been fused together into a parallel configuration. The plate is formed with parallel surfaces wherein each tube has a passageway between an opening onto the parallel surfaces. The inner surface of each passageway is coated with a high secondary emission material while the parallel plate surfaces are coated with a layer of electrically conductive material for placing a high electrostatic field between the plate surfaces.

When used in a light amplifier, a microchannel plate is placed between a photocathode and a target electrode. The light image focused upon the photocathode causes electrons to be emitted therefrom in proportion to the intensity of the light detected thereby. The electrons travelling from a particular location on the photocathode are directed by the electrostatic field to, and enter correspondingly located, passageways in the microchannel plate. As an electron enters a passageway, it strikes the side wall of the passageway which, due to the material coating thereon having a characteristically high coefficient of secondary emission, causes the remission of a number of electrons which again strike the inner surface of the passageway to re-emit a larger number of electrons and this effect continues down the channel length giving rise to a cascading increase in electrons. The increased number of electrons, hence amplified electron intensity, exit the individual passageways in the microchannel plate where, under the influence of another electrostatic field, they are accelerated toward a corresponding location on a target electrode, typically a phosphorus screen. This action is repeated at all other locations on the photocathode and microchannel plate to produce a visual image or mosaic representation of the original image upon the target electrode.

One problem with the microchannel plate is that those electrons not striking the inner passageway will strike the conductive, parallel surface of the multichannel plate and bounce back toward the photocathode or toward adjacent passageways. These electrons do not contribute to the signal but add to the noise factor.

SUMMARY OF THE INVENTION

Accordingly, it is an object of the present invention to provide a solution for impoving the noise figure of a microchannel plate.

Another object of the invention is to provide a microchannel plate where the open surface area formed by the openings of the passageways onto the plate can be made high compared to the surface area of the plate against which an electron might bounce without incurring the deleterious effects associated with such high open area ratios, such as cladding wall breakage.

In accomplishing these and other objects, there is provided a microchannel plate formed from a bundle of small cyclindrical tubes or rods. Each rod may or may not include a core whose outer periphery is surrounded by a first cladding layer. That is, each rod may be formed as a tube with the first cladding surrounding a hollow center. The outer perimeter of the cladding is surrounded by a second, super cladding layer. The original rods are then drawn to a small diameter and fused into a first bundle which may then be drawn into a smaller bundle, combined with similar bundles, and again drawn to a smaller diameter.

After the individual cylindrical rods have been reduced to the desired size, typically 10,000 to 1, the bundle is cut at a bias to the axis of the drawn tubes. The cut surfaces are then polished to provide wafers having two parallel surfaces with the cylindrical rods biased at a small angle thereto. The resultant wafer is then etched in an acid solution which attacks the core if the cylindrical rods are not hollow. The acid also attacks to a much lesser extent the first cladding. The reason that the acid attacks the core to a greater extent than the cladding is that the core is designed to be highly soluble in acid, while the first cladding is designed to be as insoluble as possible in the same acid. Further, the second or outer super cladding is designed to be highly resistant to acids and is affected to a negligible extent by the acid bath. After the acid bath has removed a portion of the core and to a lesser extent the first a cladding, the wafer is rinsed and exposed to a second acid bath which only mildly attacks the first cladding and does not affect the second cladding but which fully dissolves the core to form the passageways. The result of the acid baths is that the core has been substantially removed to form individual passageways within each cylindrical rod while the first cladding has been tapered outwardly from this passageway to the second cladding. The surface area of the microchannel plate is thus formed by the remaining second cladding, while the open area of the channel plate includes the passageways formed by the removed core that comprised each cylindrical rod plus the tapered or funneled area formed by the removal of the first cladding from each end of the passageways. The ratio of the open area (formed by the removal of the core or the hollow rod and the removal of the first cladding) to the remaining surface area (formed by the second super cladding) may thus be determined by design but is much higher than the prior art devices.

DESCRIPTION OF THE DRAWINGS

A better understanding of the present invention will be had after review of the following detailed description and consideration of the drawings wherein:

FIG. 3 is a cross-sectional view of a typical cylindrical rod used to fabricate the microchannel plate of the present invention which may or may not be hollow;

FIG. 4 is a plane view of a section of a microchannel plate incorporating the present invention; and FIG. 5 is a cross-sectional view taking along line 5—5 of FIG. 4.

DETAILED DESCRIPTION OF THE PREFERRED EMBODIMENT

Light amplifier devices are currently known in the prior art. The present invention discusses a microchannel plate which forms an important component of a light amplifier. This invention describes an improved microchannel plate wherein the passageways within the plate that receive electrons accelerated toward the plate from a photochathode have been funneled on the input side to produce a larger opening. Due to this funneling or tapering, the open area of the microchannel plate is large compared to the surface area upon which the accelerated electrons might impinge.

Figure 1:
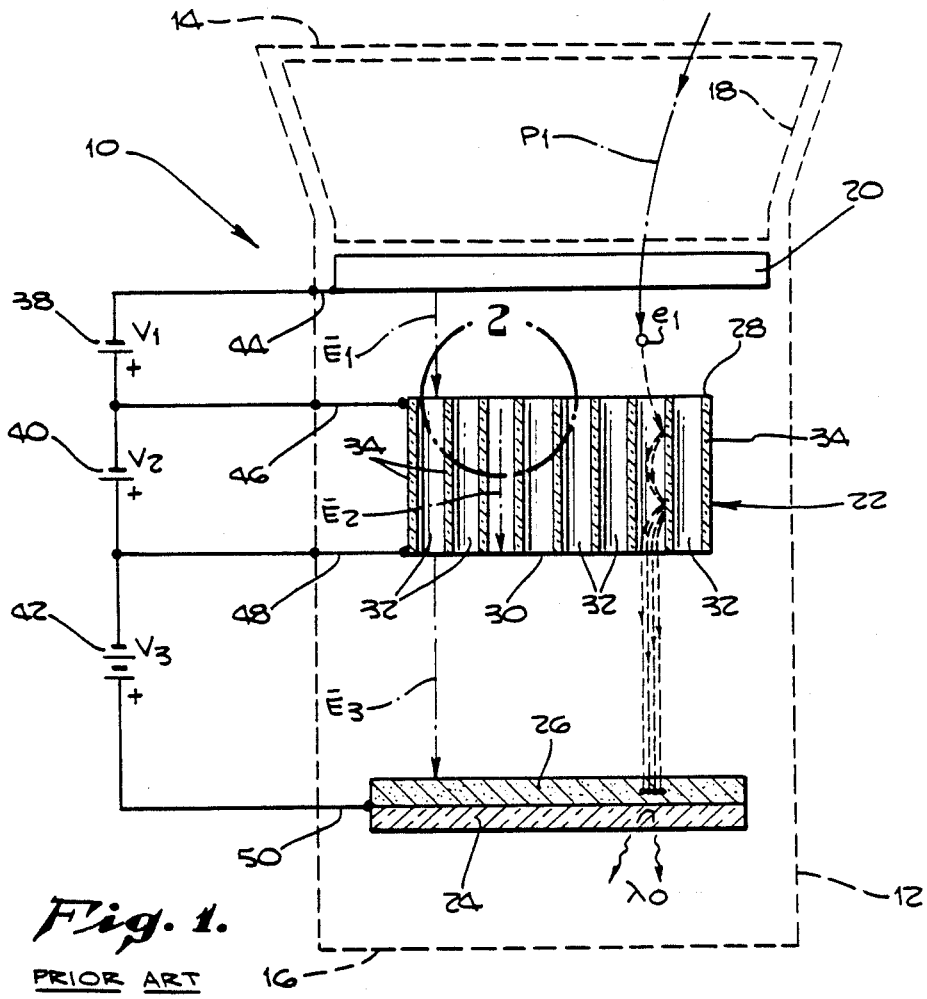
FIG. 1 is a schematic representation of a light amplifier device incorporating a microchannel plate which is known in the prior art.

FIG. 1 illustrates the basic elements of a direct view type light amplifier device 10 which incorporates the present invention. The light amplifier includes an envelope or housing 12, represented by the dashed lines, made of suitable glass or ceramic material. The inside of the housing 12 is evacuated. Housing 12 includes an optically transparent face plate 14, represented by dashed lines, which permits the entry of an optical image. In a direct viewed tube, housing 12 is completed by an optically transparent rear window 16 through which to view the amplified image.

Just behind the face plate 14 is a conventional electron or light optical system 18 also indicated by dashed lines. The system 18 may simply be a transparent space through which to allow the light image, illustrated by photon $P_1$, to pass or a complexed, though conventional, structure for converting the received light image into a source of electrons representative of that image. Additionally, a conventional optical lenses focusing system, not shown, may be located in a conventional manner in front of the face plate 14.

A photocathode 20 is mounted within housing 10 behind the light optical system 18 and before a microchannel plate 22. Photocathode 20 is a circular disk having a predetermined area constructed and supported within the tube envelope 12 in a well-known manner. Suitable photocathode materials are cesium and antimony and the preferred material is a sodium potassium-cesium antimony compound, commercially sold under the designation S-20.

A target or display electrode 24 is located at the rear of housing 12. In a typical light amplifier, the target electrode, usually referred to as the "screen" in a direct view tube, is generally a circular disk-shaped geometry and consists of a coating of an electroluminescent material, such as P-20 phosphor. The phosphor is typically a coating on the face plate 14. The phosphor, in turn, is backed with a coating of a thick, electron permeable layer of aluminum 26, suitable 500 to 1,000 A in thickness, to enhance its electrical conductivity and function as an electrode for target electrode 24.

Spaced above the target electrode 24 is the multichannel plate 22 which is mounted within housing 12 by conventional means. The multichannel plate 22 consists typically of a plurality of cylindrical glass rods which, in many prior art microchannel plates, includes an inner core and an outer cladding or a hollow tube formed by the outer cladding. The individual rod is drawn from its initial diameter of approximately one inch to 0.030 inches. Thereafter, the rod is bundled with other rods and fused into a multi-fiber bundle. The bundles are then drawn with additional bundles to a smaller size. Next, the bundle is sliced and polished to form a pair of parallel surfaces 28 and 30 and exposed to acid baths which remove the core while leaving the cladding if a core is used. The removed core thus forms passageways 32 while the cladding that was unaffected by the acid baths remained as walls 34. In a conventional microchannel plate, the surfaces 28 and 30 are then coated with a conductive metal, not illustrated, to form the electrically conductive surfaces for the microchannel plate 22. Once the cladding is removed, the walls of the passageways are placed in a reducing atmosphere, typically $H_2$, at elevated temperatures, typically 300°–475° C., for a period of time ranging from 10 minutes to 16 hours, depending on the glass composition used. A typical glass composition is silicate glass having about 30 to 60 percent lead oxide, PhO, and a molecular basis to provide a secondary emission surface. While the internal coating is considered electrically conductive, it is highly resistive, on the order of 100 megaohms, and thus does not form an electrical short between parallel surfaces 28 and 30. Typically, the diameter of the passageways 32 is on the order of 0.2 mills and the openings of passageways 32 form approximately 50 percent of the total face area of surfaces 28 and 30. In some prior art microchannel plates, the cladding that forms walls 34 is etched to taper the openings of passageways 32. However, this etching must be limited to prevent the erosion of the walls 34. In most prior art devices that have been funneled by such etching, the ratio of open area to surface area is limited to approximately 75 percent because beyond such limit erosion of the walls 34 formed between each passageway 32 is likely.

The upper surface 28 of the microchannel plate 22 may be coated with a thin layer of aluminum, not shown, to block positive ions which are unavoidably generated by electron impact upon surfaces of passageways 32 from being accelerated back toward the photocathode 20. Such layer is thin enough to be transparent to electrons. This arrangement is fully described in U.S. Pat. No. 3,742,224, which issued on June 26, 1973, by B. C. Einstein, and which is assigned to the common assignee. A power supply is provided to the photocathode 20, microchannel plate 22, and target electrode 24 by, for example, sources 38, 40 and 42. Source 38 is connected between photocathode 20 and conducted surface 28 by conductors 44 and 46, respectively; while source 40 is connected between surfaces 28 and 30 by conductors 46 and 48, respectively; and source 42 connected between surface 30 and target electrode 24 by conductors 48 and 50, respectively.

A typical 1 inch diameter microchannel plate will include over 2,000,000 individual glass rods with a like number of passageways 32.

When the light amplifier device is energized, the source 38 will typically have a voltage on the order of 0 to 230 volts, particularly 200 volts, in order to establish an electrostatic field of a predetermined intensity gradient between the front surface 28 of the microchannel plate 22 and the photocathode 20 which field is represented by the arrow labeled $\overline{E}_1$. The second source 40 may have a voltage on the order of 300 to 1,000 volts, typically 800 volts. This places the voltage between the front and rear surfaces, 28 and 30, respectively, to establish an electrical field represented by the arrow labeled $\overline{E}_2$ of predetermined intensity between the surfaces in a direction toward the lower surface 30 of, typically, $12.6 \times 10^3$ volts/cm. A third bias voltage on the order of 3,000 to 8,000 volts, typically 5,000 volts, is provided by source 42. This voltage establishes a predetermined electric field represented by arrow $\bar{E}_3$ between surface 30 and target electrode 24 on the order of $3 \times 10^3$ to $7 \times 10^3$ volts/cm.

As seen in FIG. 1, a photon, $P_1$, serves to illustrate the conventional operation of the microchannel plate 22. This photon strikes the photocathode 20 and causes the emission of an electron, $e_1$, which is accelerated toward the microchannel plate 22. The electron goes into a passageway 32 where it comes under the influence of the electric field, $\bar{E}_2$, established by source 40. Because of its random transverse travel and because passageways 32 are at an angle to surface 28, not shown, the electron collides with the passage walls 34. The passage walls are coated with a high secondary emission material having a secondary emission coefficient greater than one, at average impact velocity. Thus, the electron knocks out more than one additional electron and these accelerate toward the lower surface 30 of the microchannel plate 22 within passageway 32. As illustrated in FIG. 1, the secondary electrons having random velocity vector angles, in turn, strike the walls of the passageway 32 at subsequent locations to knock off even more electrons in a cascading process. The electrons exit from the back surface 30 and are again accelerated to strike the target electrode 24 which causes the conventional emissioon of light, $\lambda_O$, in proportion to the amount of electron bombardment from the microchannel plate 22.

Figure 2:
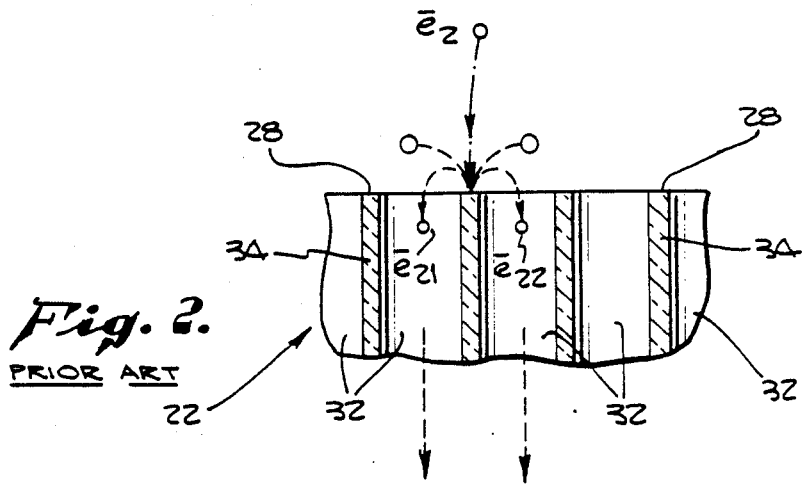
FIG. 2 is an enlarged section of a portion of the microchannel plate shown in FIG. 1.

The light amplifier device 10 described thus far is part of the prior art. Similarly, the microchannel shown in FIG. 2 is also part of the prior art. Note, however, that in practice the ratio of open passageways 32 to surface area 28 shown in FIG. 2 is typically only 50 percent even though it is shown schematically higher. FIG. 2 illustrates how an electron, $e_2$, might strike the solid surface 28 formed by the existence of the cladding of walls 34. In this situation, the electron is absorbed in the cladding and is thereby lost to the multiplication process. In other cases, each electron is not absorbed but rather bounces into an adjacent passage, as illustrated by $e_{21}$ and $e_{22}$ in FIG. 2. This possibility would cause a decreased signal to noise ratio within the microchannel plate. It is thus desirable to increase, as much as possible, the open area formed by the passageways 32 which face the photocathode 20 so as to increase the impact area. Impact as used here means any area impacted by an electron which leads to secondary emission. As stated above, prior art microchannel plates have attempted to do this by etching the cladding to outwardly taper each passageway 32 so as to increase the area of the openings of the passageways and reducing the surface area 28 when compared to the area of the opening. Such approaches have not been successful until now as too much etching would cause the erosion of the walls 34. Such approaches have been unsuccessful because it is difficult to achieve a maximum open area ratio without causing some channel wall erosion. This erosion leads to field emissions and similar contamination caused by particles breaking off the eroded channel walls. Thus, at best, prior art funneling has been limited to a 75 percent ratio of passageway opening to surface area.

The present invention permits a ratio of greater than 90 percent of the open area to surface area through the utilization of a second, control or super cladding while avoiding previously mentioned problems of wall erosion. Referring now to FIG. 3, a typical cross section of an individual cylindrical glass rod 52 is shown having a core 54 constructed from a glass that has a low acid resistance or is highly soluble in acid. Surrounding the perimeter of the core 54 is a first cladding 56 constructed from a glass that is partially soluble in some acids. The perimeter of the first cladding 56 is, in turn, surrounded by a second, super cladding 58 constructed from a glass that is highly resistant to acids.

The core 54 may typically be a glass that includes barium oxide, boron oxide, lanthanum oxide and silicon oxide; such glass is commonly referred to as lanthanum glass. The first cladding 54 may typically include: lead oxide, silicon oxide, potassium oxide and rubidium oxide; such glass is known as lead glass. Finally, the outer cladding 58 may include silicon oxide, lead oxide and zirconim oxide with low sodium; such glass being commonly known as an acid resistant glass.

To fabricate the microchannel plate 22, a composite glass rod 52 is first fabricated from either a hollow first tube, such as tube 56, or from a core 54 surrounded by tube 56. If a core 54 is used, the core is inserted into the first hollow cladding tube 56 and the combination is then inserted into the second hollow cladding tube 58. The overall diameter of the combined core 54 and first and second claddings, 56 and 58 respectively, is approximately one inch. This is the same diameter whether a hollow tube 56 is used with or without a solid core 54. The composite rod 52 is then heated and drawn to approximately 0.03 inches in diameter by known methods. Each rod is next cut to a predetermined length and placed in bundles of adjacent fibers. Each bundle is then reheated and redrawn. The bundle of adjacent fibers deforms during the reheat and redraw steps to form the hexagonal shapes shown in FIG. 4. This is accomplished by selecting a core 54 and/or first cladding 56 with a higher viscosity during the second drawing step than the second cladding 58. Because the second clad becomes softer, it flows into the hexagonal configuration shown.

The fiber bundles are then cut to a predetermined length, stacked into another bundle and drawn again after reheating. The resultant rod is then cut into wafers which are polished on two opposing planar surfaces. The opposing parallel surfaces 28 and 30 are arranged at a small angle to the axis of the fibers formed from rods 52, typically this angle may vary from 7 to 15 degrees.

The wafers are then subjected to core removal by an acid bath typically of hydrochloric solution. The core is etched for a time sufficient to remove the core material 54 to the depth of the wafer. The wafer is then washed in deionized water bath and a second acid bath in hydrofluoric acid, HF, of 1 to 5 percent concentration, 1 percent being preferred, for 1 to 4 minutes is commenced. The hydrofluoric acid etches faster at the surface than at a depth for creating funnel-like openings within each passageway 32, FIG. 5. The wafer is then again rinsed in deionized water bath.

At this stage, the funnels are formed all the way to the edge of the acid resistant, second cladding 58 without the danger of etching through to the second cladding to the next passageway 32.

It has been found that the second cladding 58 of high acid resistant glass has significant value in that it prevents the acid baths from etching through to adjacent passageways 32. Using the funneling procedure thus described, it has been possible to establish a microchannel plate 22 which has a ratio of open passageway area to surface area better than 90 percent without any evidence of wall erosion.

Those skilled in the art will understand that the fabrication, polishing, and etching of the fiber bundles formed by glass rods 52 into a microchannel plate 22 will follow the same steps whether a solid core 54 with a first cladding 56 or hollow tube formed by first cladding is used. The only difference is that the etching steps to remove the core 54 are modified. Further, the present invention may be used to form a single fiber having a funneled opening. Lastly, the use of a second, super cladding 58 permits design control not found in the prior art. That is, the ratio of the open area of the surface walls of the microchannel plate 22 may now be closely controlled due to the presence of the super cladding.

It is claimed:

1. A microchannel plate, having parallel surfaces comprising:
   a plurality of fibers fused together to form said plate;
   each fiber having a central passageway surrounded by a first cladding whose ends open onto said parallel surfaces;
   said first cladding having a perimeter surrounded by a second cladding;
   said first cladding openings outwardly tapered on at least one of said parallel surfaces.

2. A microchannel plate, as claimed in claim 1, additionally comprising:
   said first and second cladding outwardly tapered at an opening onto at least one of said parallel surfaces.

3. A microchannel plate, as claimed in claim 1, additionally comprising:
   said plurality of fibers having said passageways oriented at an angle to said parallel surfaces.

4. A microchannel plate, as claimed in claim 1, wherein:
   said plurality of fibers are formed from hollow glass tubes.

5. A microchannel plate, as claimed in claim 1, wherein:
   said plurality of fibers are formed from a glass tube surrounding a central glass core, said core being removed during fabrication of said microchannel plate.

6. A microchannel plate, as claimed in claim 5, wherein said plurality of fibers are each formed from three types of glass;
   said central core formed from a glass having a low acid resistance;
   said first cladding formed by a partially acid resistive glass; and
   said second cladding formed by a highly acid resistive glass.

7. A microchannel plate having parallel surfaces with a plurality of passageways opening onto said surfaces, comprising:
   a plurality of first tubes surrounding said passageways;
   a plurality of second tubes surrounding said first mentioned tubes;
   said first mentioned tubes outwardly tapered at said openings of said passageways substantially to said second mentioned tubes;
   said second mentioned tubes thus forming said parallel surfaces, wherein the ratio of the open area created by said openings formed by said tapered first tubes to the surface area created by said second tubes is determined by the surface area of said second tubes.

8. A microchannel plate, as claimed in claim 7, additionally comprising:
   said first mentioned tubes formed from a partially acid resistive glass; and
   said second mentioned tubes formed from a highly said resistive glass.

9. A microchannel plate, as claimed in claim 7, wherein:
   said first mentioned tubes have a circular inner diameter and a circular outer perimeter; and
   said second mentioned tubes have a circular inner opening and a hexagonal outer perimeter.

10. A microchannel plate for use in a light amplifier having parallel surfaces with a plurality of passageways opening onto said surfaces, comprising:
    said plate formed from a plurality of fibers each fiber having three types of glass;
    a first inner glass having a low acid resistance, a second intermediate glass having a partial acid resistance, and a third outer glass having a high acid resistance;
    said third glass located on the outer perimeter of said second glass forming a barrier therebetween.

11. A microchannel plate, as claimed in claim 10, wherein:
    said first glass is removed by an acid bath to form said passageways;
    said second glass is partially removed by an acid bath at said surfaces to funnel said passageways; and
    said third glass remains substantially unaffected by said acid baths to form said barier.

12. A fiber for transmitting electromagnetic energy, comprising:
    a fiber having a central passageway surrounded by a first cladding to form fiber ends onto which said passageway opens;
    said first cladding having a perimeter surrounded by a second cladding;
    said first cladding openings outwardly tapered on at least one of said ends.

13. A fiber, as claimed in claim 12, additionally comprising:
    said first and second claddings outwardly tapered at an opening onto at least one of said ends.

14. A fiber, as claimed in claim 12, wherein: said fiber is formed from hollow glass tube.

15. A fiber, as claimed in claim 12, wherein:
    said fiber is formed from a glass tube surrounding a central glass core; said core being removed during fabrication of said fiber.

16. A method for forming a microchannel plate, comprising the steps of:
    forming a fiber having a central passageway there through by surrounding said passageway with a first cladding;
    further forming said fiber by surrounding said first cladding with a second cladding;
    heating said first and second claddings and drawing said claddings to a desired diameter;
    cutting said drawn claddings to a predetermined length and bundling said cut claddings;
    reheating said bundle of claddings and drawings said bundle to a desired diameter;
    cutting said drawn bundle into wafers and polishing said wafers to form opposite parallel surfaces; and acid etching at least one of said wafer surfaces to remove said first cladding at the openings of said passageways onto said surface to form tapered openings.

17. A method, as claimed in claim 16, wherein:
said first cladding is a glass having a partial resistance to acids; and
said second cladding is a glass having a high resistance to acids.

18. A method, as claimed in claim 16, wherein:
said acid etching is conducted with an acid bath of 1 to 5 percent concentration of hydrofluric acid for 1 to 4 minutes.

19. A method, as claimed in claim 16, comprising the additional steps of:
placing a glass core within said central passageway formed by said first cladding; and
removing said core by an acid bath.

* * * * *